_US009775041B2_

United States Patent
Babbitt et al.

(10) Patent No.: US 9,775,041 B2
(45) Date of Patent: Sep. 26, 2017

(54) SYSTEM AND METHOD FOR TETHERING TO A MOBILE COMMUNICATION DEVICE

(71) Applicant: 9S LLC, Cleveland, OH (US)

(72) Inventors: Ross M. Babbitt, Cleveland, OH (US); Brad Anderson, Cleveland, OH (US)

(73) Assignee: 9S LLC, Cleveland, OH (US)

( * ) Notice: Subject to any disclaimer, the term of this patent is extended or adjusted under 35 U.S.C. 154(b) by 1 day.

(21) Appl. No.: 14/952,405

(22) Filed: Nov. 25, 2015

(65) Prior Publication Data

US 2016/0174199 A1    Jun. 16, 2016

Related U.S. Application Data

(60) Provisional application No. 62/090,922, filed on Dec. 12, 2014.

(51) Int. Cl.
*H04W 12/08*    (2009.01)
*H04L 29/06*    (2006.01)

(52) U.S. Cl.
CPC ......... *H04W 12/08* (2013.01); *H04L 63/0272* (2013.01)

(58) Field of Classification Search
CPC .... H04W 12/08; H04W 72/04; H04L 63/0272
USPC ................................................ 455/410, 450
See application file for complete search history.

(56) References Cited

U.S. PATENT DOCUMENTS

| 5,798,907 | A | * | 8/1998 | Janik | G06F 1/163 361/679.03 |
|---|---|---|---|---|---|
| 7,382,268 | B2 | | 6/2008 | Hartman | |
| 7,549,007 | B1 | | 6/2009 | Smith et al. | |
| 8,307,134 | B2 | | 11/2012 | Galloway et al. | |
| 8,509,686 | B2 | | 8/2013 | Bennett et al. | |
| 8,615,072 | B2 | | 12/2013 | Mahalingam | |
| 8,655,328 | B2 | | 2/2014 | Dossas et al. | |
| 8,897,447 | B1 | * | 11/2014 | Rohrweck | H04W 12/08 380/270 |
| 2012/0003960 | A1 | * | 1/2012 | Parmar | H04L 41/046 455/411 |
| 2012/0058744 | A1 | * | 3/2012 | Felt | H04M 3/382 455/414.1 |

(Continued)

*Primary Examiner* — Nathan Taylor
(74) *Attorney, Agent, or Firm* — Vorys, Sater, Seymour and Pease LLP; Edward Gecovich, Esq.

(57) ABSTRACT

A mobile tethering device includes a wireless transceiver, a processor, a computer tangible storage device, and program instructions stored on the storage device for execution by the processor. The program instructions include first program instructions to receive a request to initiate a connection with a remote communications device. The program instructions further include second program instructions to establish a wireless connection with a mobile communication device via the wireless transceiver. The program instructions further include third program instructions to communicate data indicative of a request to initiate a telephone call to the mobile communication device, wherein the mobile communication device is configured to initiate the telephone call via a public switched telephone network. The program instructions further include fourth program instructions to communicate data associated with the telephone call to the mobile communication device.

22 Claims, 3 Drawing Sheets

(56) References Cited

U.S. PATENT DOCUMENTS

| | | | | |
|---|---|---|---|---|
| 2012/0081502 | A1* | 4/2012 | Naidu | H04N 7/147 348/14.04 |
| 2013/0107783 | A1* | 5/2013 | Shaw | H04W 4/06 370/312 |
| 2013/0217369 | A1* | 8/2013 | Robbins | H04W 4/16 455/414.1 |
| 2013/0254264 | A1* | 9/2013 | Hankinson | H04L 29/06047 709/203 |
| 2013/0300817 | A1* | 11/2013 | Naidu | H04N 7/147 348/14.02 |
| 2013/0331028 | A1* | 12/2013 | Kuehnel | H04W 76/02 455/41.1 |
| 2014/0045471 | A1* | 2/2014 | Karnalkar | G06Q 10/107 455/415 |
| 2015/0003432 | A1* | 1/2015 | Tanaka | H04W 76/021 370/338 |
| 2015/0201444 | A1* | 7/2015 | Kiukkonen | H04W 72/0406 455/450 |
| 2015/0281181 | A1* | 10/2015 | Albisu | H04L 63/0272 726/7 |

\* cited by examiner

SYSTEM AND METHOD FOR TETHERING TO A MOBILE COMMUNICATION DEVICE

CROSS-REFERENCE TO RELATED APPLICATION

This application claims priority from U.S. Patent Application No. 62/090,922, filed on Dec. 12, 2014, which is incorporated by reference herein in its entirety.

FIELD OF DISCLOSURE

The present disclosure relates to the field of mobile communication. More particularly, the present disclosure relates to mobile tethering device.

BACKGROUND

Mobile telephones, and smartphones in particular, are commonly used for communicating with others. Smartphones typically include an operating system as well as a combination of hardware and software to facilitate various forms of communication as well as to take measurements of the environment and to perform other computing functions. In addition to making telephone calls for example, a variety of types data can be generated, stored, and communicated by a smartphone including text messages, videos, images, and so on. Existing smartphones also include applications that can be used for a variety of entertainment and productivity purposes. Such activities further result in an assortment of data being generated and stored on the smartphone. An existing smartphone will further include one or more cameras, geo-location technology which generates, stores, and communicates data about the location of the smartphone, as well as other accessory sensors including gyroscopes, accelerometers, thermometers, and the like. All of these accessory sensors are available to an existing smartphone's operating system, often in ways which the user cannot control or even monitor. Further, the use of a smartphone's cellular telephony equipment causes the device to interact with the cellular communication network, which itself generates a granular data set of the geolocation of the user.

The large amounts of data generated and stored by a smartphone may often be confidential. Accordingly, smartphone users often take measures to try and protect the data. Nevertheless, if a smartphone is lost or stolen or compromised by an attacker, such confidential data could potentially be accessed and exploited by unauthorized individuals. For example, even if a smartphone owner implements a passcode lock, an attacker may circumvent the passcode and gain access to stored data. In some situations, even after the smartphone owner believes to have deleted the data, an attacker or hacker may be able to use forensic techniques to retrieve data from a smartphone. In addition, sensitive data such as the location of a smartphone may be susceptible to being accessed by unauthorized, individuals even while an owner is still in possession of the smartphone. Furthermore, given the broad range of applications of a smartphone, it is difficult for a parent to monitor and control the type of applications being used and the amount of sensitive data being created by a child.

In this manner, a modern smartphone presents an array of security problems which are either impractical or impossible to protect against via currently available means. The functionality of a modern smartphone's operating system and associated hardware are such that a sophisticated attacker will always have a means to compromise the data on the smartphone, no matter what countermeasures the user implements. This is because the smartphone itself is a compact, plenary, recording, environmental-sensing, geolocating, computer processing device which users typically carry on their persons.

SUMMARY

A solution to many of the vulnerabilities presented by a modern smartphone are provided herein and rely, generally, on uncoupling or eliminating the telephony capability of the devices as well as eliminating or reducing the hardware incorporated into the device.

A mobile tethering device includes a wireless transceiver, a processor, a computer tangible storage device, and program instructions stored on the storage device for execution by the processor. The program instructions include first program instructions to receive a request to initiate a connection with a mobile communications device. The program instructions further include second program instructions to establish a wireless connection with the mobile communication device via the wireless transceiver. The program instructions further include third program instructions to communicate data indicative of a request to initiate a telephone call to the mobile communication device, wherein the mobile communication device is configured to initiate the telephone call via a public Witched telephone network. The program instructions further include fourth program instructions to communicate data associated with the telephone call to the mobile communication device.

A method for tethering to a mobile communication device includes the step of a computing device receiving a request to initiate a connection with a mobile communications device. The method further includes the step of the computing device establishing a wireless connection with the mobile communication device. The method further includes the step of the computing device communicating, data indicative of the request, to initiate the telephone call to the mobile communication device, wherein the mobile communication device initiates the telephone call via, a public switched, telephone network. The method further includes the step of the computing device communicating data associated with the telephone call to the mobile communication device.

A mobile tethering device includes a wireless transceiver, a processor, a computer tangible storage device, and program instructions stored an the storage device for execution by the processor. The program instructions include first program instructions to receive a request to initiate a telephone call. The program instructions further include second program instructions to initiate a telephone call directly via a public switched telephone network. The program instructions further include third program instructions to receive a request to operate a mobile application. The program instructions further include fourth program instructions to establish a wireless connection with a mobile communication device via the wireless transceiver. The program instructions further include fifth program instructions to communicate data indicative of the request to operate a mobile application to the mobile communication device, wherein the mobile communication device is configured to initiate operation of the mobile application. The program instructions further include sixth program instructions to communicate data associated with operation of the mobile application to the mobile communication device.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
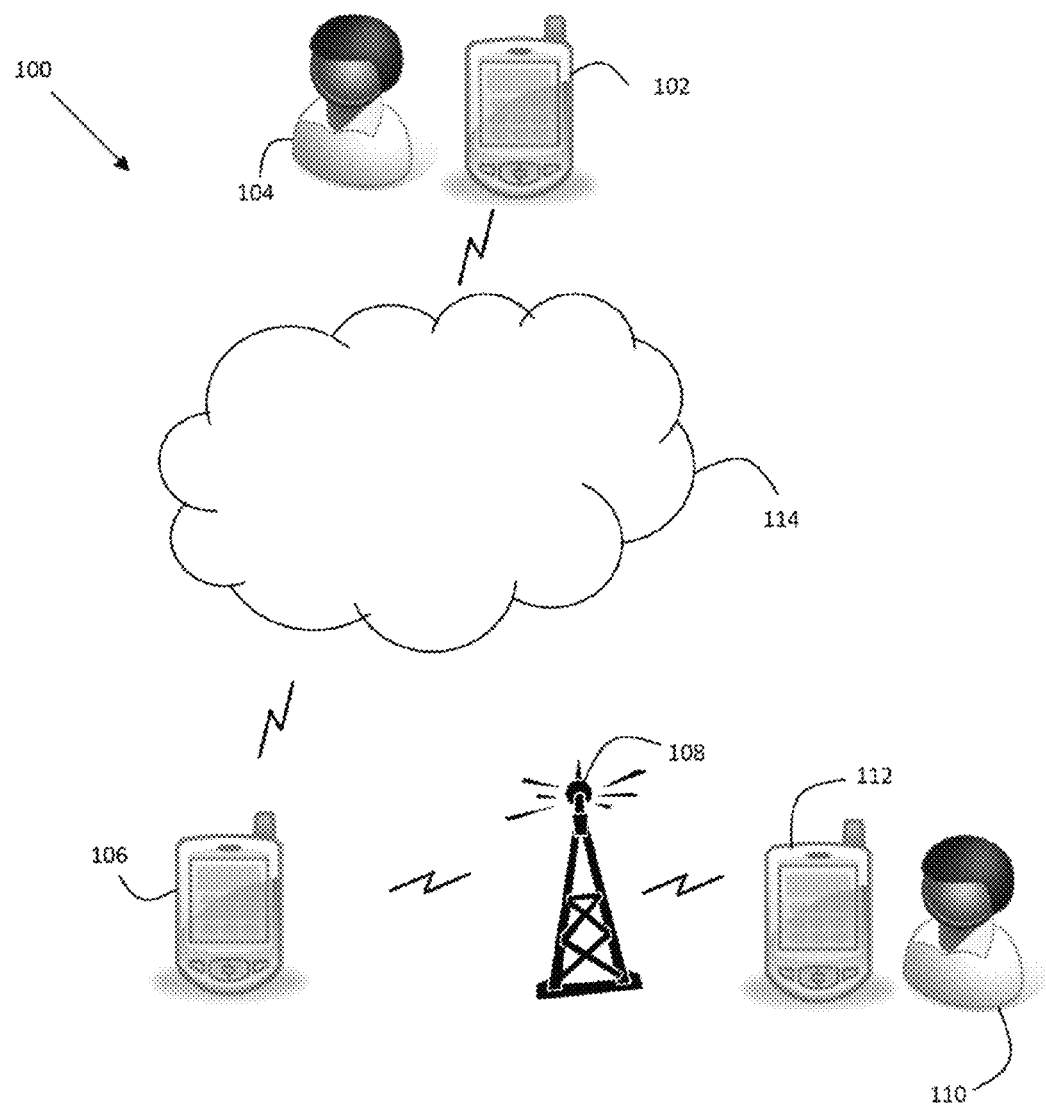
FIG. 1 illustrates an example system for tethering to a mobile communication device.

FIG. 1 illustrates a system 100 for tethering to a mobile communication device. System 100 includes a mobile tethering device 102 that indirectly provides a user 104 with functionality typically associated with a known mobile communication device 106 such as an existing or known smartphone. Mobile communication device 106 can include any suitable smartphone having any suitable number of applications installed thereon. For example, mobile communication device 106 can be an Apple iPhone including pre-installed applications such as a web browser or a calendar as well as applications downloaded via the App Store such as games and social media applications. Mobile communication device 106 is able to leverage the Public Switched Telephone Network (PSTN) 108 to make and receive telephone calls and send and receive text messages, for example, to a recipient 110 via recipient's device 112. Mobile communication device 106 is also able to leverage the PSTN 108 to download and install new applications and to transmit and receive associated data. Mobile communication device 106 is also able to leverage the PSTN 108 to obtain geo-location information. Mobile communication device 106 may be remote from mobile tethering device 102 or within proximity of mobile tethering device 102.

Mobile tethering device 102 looks and feels similar to a mobile communication device 106. In one example, mobile tethering device 102 looks and feels identical to a mobile communication device 106. However, mobile tethering device 102 is unable to access the PSTN 108 directly to make calls or to send text messages to a recipient 110. Furthermore, mobile tethering device 102 is unable to directly download and install applications. In addition, mobile tethering device 102 is unable to be geo-located. In particular, mobile tethering device 102 lacks the operating system, firmware, and hardware typically associated with a mobile communication device 106 for accessing a PSTN 108. Mobile tethering device 102 does not store any sensitive data. Thus, if mobile tethering device 102 is lost or stolen, or even while user 104 is still in possession of mobile tethering device 102, an attacker or hacker is deprived of the ability to steal sensitive data, to conduct cell phone forensics, and to obtain geo-location information about user 104.

Instead, mobile tethering device 102 connects to mobile communication device 106 over the Internet 114 and leverages the hardware and software of mobile communication device 106 to access the PSTN 108 and to seamlessly operate as if mobile tethering device 102 was itself a mobile communication device 106. The functionality appears seamless to user 104 in that the user is able to make phone calls using voice-over-IP, send text messages, and use other applications and perform other functions typically associated with a mobile communication device 106 as if mobile tethering device 102 was itself a mobile communication device 106 with all of the associated hardware, software, and functionality. From the recipient's 110 perspective, communication with user 104 remains seamless as well. In other words, recipient 110 isn't aware of the user 104 utilizing a mobile tethering 102 device connected to a mobile communication device 106. Rather, it appears to recipient 110 as though user 104 is using a mobile communication device 106.

By creating such a separation between user 104 and mobile communication device 106, mobile communication device 106 may be safely stored in a secure location while the user travels freely without concern over mobile communication device 106 being stolen or compromised by an unauthorized individual. At the same time, however, user 104 is still able to utilize mobile communication device 106 from anywhere as long as an Internet connection is available. For example, a user may chose to leave the mobile communication device 106 at home or at an office when going to a location where the user may be at risk of losing the mobile communication device 106. The user may instead bring a mobile tethering device 102, thus enabling the user to still access the features and functionality of the mobile communication device 106 while at the location or destination, as long as the location has WiFi. In one example, a user may carry a mobile tethering device 102 when exercising at a gym in order to access the mobile communication device 106 while leaving the mobile communication device 106 at home, at an office, or in a locker at the gym.

In one example, mobile tethering device 102 connects securely to the mobile communication device 106 via a suitable encrypted connection such as a Virtual Private Network (VPN). In one example, mobile tethering device 102 anonymizes and encrypts all data communication with mobile communication device 106.

Once connected to mobile communication device 106, or the anchor device, user 104 is able to carry out functions, via mobile tethering device 102, which would typically be associated with mobile communication device. 106. For example, user 104 can download and install new applications to mobile communication device 106, send and receive emails, make telephone calls, use a calendar function, edit photographs, and so on. By masking the user, however, the location of the user 104 and mobile tethering device 102 remains invisible to the PSTN 108 as well as to recipient. 110 and potential hackers or attackers.

In one example, mobile tethering device 102 does not enable a user 104 to download or install new application on mobile communication device 106 but only enables user 104 to access previously installed applications. Rather, applications may only be downloaded and installed by an individual with appropriate authorization via mobile communication device 106 directly. In this example, an administrator with direct access to mobile communication device 106, such as a parent for example, may control and monitor which applications user 104, such as a child, may have access to, while still giving the child the functionality typically associated with mobile communication device 106.

In one example, the administrator may create different roles having different access levels. For example, a first user of mobile tethering device 102 having a first access level may be given access to a first subset of applications and features of mobile communication device 106 while a second user of mobile tethering device 102 having a second access level may be given access to a second subset of applications and features of mobile communication device 106, different than the first subset.

In one example, mobile tethering device 102 is paired to a specific mobile communication device 106 via a unique encrypted key pair. Thus, a single mobile tethering device 102 is only capable of pairing with a single predefined mobile communication device 106 by providing a unique key to mobile communication device 106 for confirming identity and proper authorization. In another example, mobile tethering device 102 may be configured to pair with any mobile computing device if granted appropriate permission by an administrator of the mobile computing device. For example, mobile tethering device 102 may connect with a mobile computing device if the 102 knows a predefined key or password associated with the mobile computing device. In one example, a plurality of mobile tethering devices may he given access to pair with a single mobile computing device.

Figure 2:
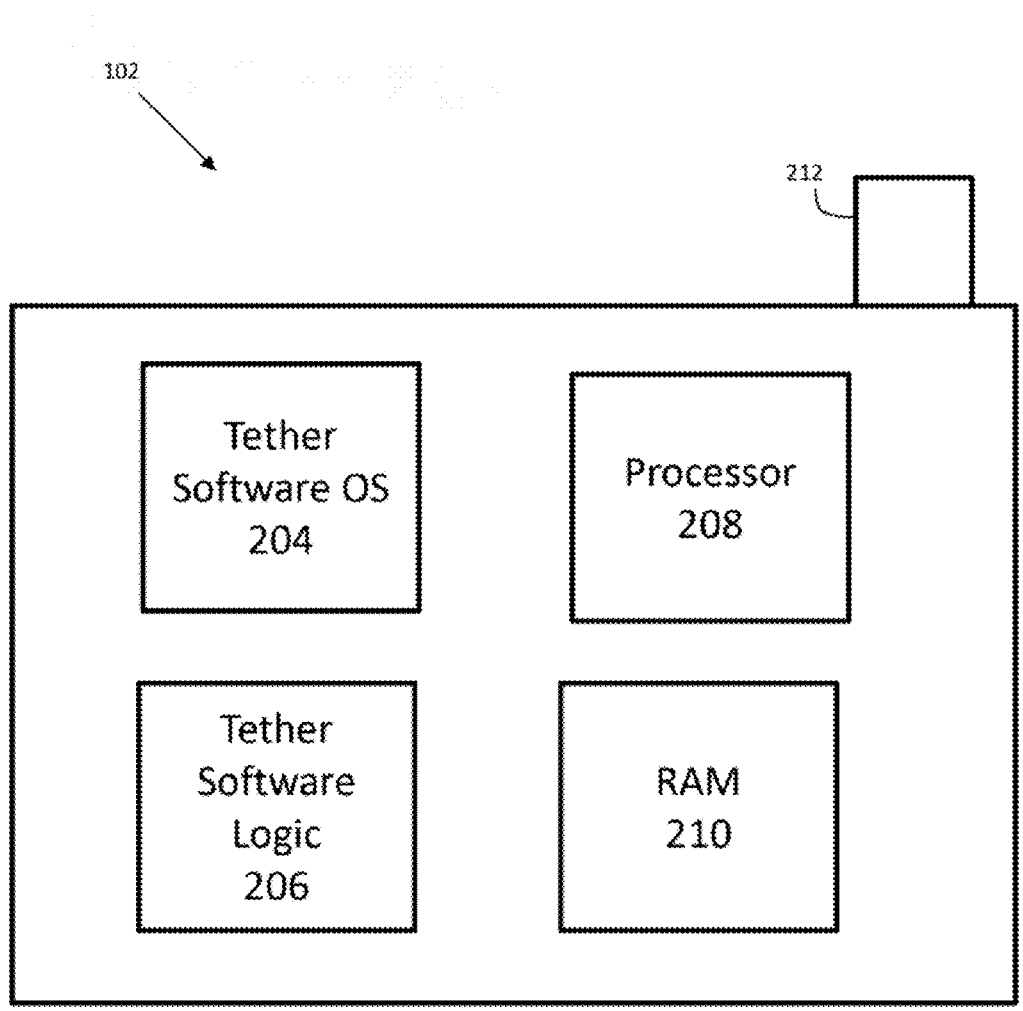
FIG. 2 illustrates an example mobile tethering device.

In order to connect with mobile communication device 106, mobile tethering device 102 includes hardware and software, as illustrated in FIG. 2, for connecting with and leveraging the capabilities of mobile communication device 106 and for providing tethering device 102 functionality. Mobile tethering device 102 includes a mobile tethering operating system 204 that lacks the functionality and features of an operating system of mobile communication device 106, but enables mobile tethering device 102 to connect with and utilize the operating system of mobile communication device 106. In particular, mobile tethering operating system 204 provides mobile tethering device 102 with access to resources of mobile communication device 106.

Mobile tethering device 102 includes tethering logic 206 that provides user 104 with a user interface that resembles one of a mobile communication device 106 and provides user 104 with similar or substantially the same functionality and level of interaction as if the user 104 was interacting directly with mobile communication device 106. Tethering logic 206 further facilitates connecting with and communicating data with mobile communication device 100. In one example, tethering logic 206 is software that is loaded and executed in the mobile tethering operating system 204. In one example, mobile tethering device 102 lacks an operating system but rather loads and executes tethering logic 206 automatically.

Mobile tethering device 102 further includes a processor 208 that executes tethering operating system 204 and tethering software logic 206. Mobile tethering, device 102 further may include random access memory (RAM) 210 for temporarily storing data being communicated to and from mobile communication device 106. By only storing data temporarily, mobile tethering device 102 deprives an attacker the ability to retrieve sensitive data from the device, should the device become compromised.

Mobile tethering device 102 further includes a wireless transceiver 212 for transmitting and receiving data to and from the mobile communication device 106. In one example, wireless transceiver 212 is a WiFi transceiver. It should be appreciated that wireless transceiver can be configured to communicate with a suitable wireless network with a suitable wireless protocol. For example, wireless transceiver 212 may be a Bluetooth transceiver, am RF transceiver, and so on.

In one example, mobile tethering, device 102 includes additional hardware to more closely resemble a mobile communication device 106 and to provide user 104 with the same user experience as if user 104 was interfacing directly with mobile communication device 106. For example, mobile tethering device 102 may include a camera, a microphone, a speaker, an accelerometer, a gyroscope, or other suitable hardware components (not shown). Such additional hardware would enable user 104 to generate and communicate data to mobile communication device 106 for processing as if the data was generated by mobile communication device 106.

In one example, the chassis (not shown) of mobile tethering device 102 is potted to deprive an unauthorized user or an attacker the ability to conduct advanced analysis of the components of mobile tethering device 102. Potting may include filling the chassis with epoxy or other suitable material, for example.

In one example, in order to prevent backwards infection of mobile communication device 106 via a compromised mobile tethering device 102, all data being communicated to mobile communication device 106 is sandboxed as a native component to an application of mobile tethering device 102, in other words, data received from mobile tethering device 102 is isolated at mobile communication device 106 and prevented from infecting components of mobile communication device 106. In such an example, the tethering device 102 further includes necessary sandbox information in order to isolate the data.

In one example, mobile tethering device 102 may further include hardware and software (not shown) required for accessing the PSTN 108 and for making telephone calls. However, in order for a user 104 of mobile tethering device 102 to utilize software applications beyond those necessary to make telephone calls, mobile tethering device 102 would still connect to a mobile communication device 106 and interface with the applications installed on the mobile computing device. Although mobile tethering device 102 is able to access the PSTN 108 directly, data traffic associated with other non-telephone related applications are still routed through mobile communication device 106. Thus, an administrator, such as a parent or guardian, of the mobile communication device 106 may monitor smartphone applications that a user 104 of mobile tethering device 102 is given access to. The lack of software applications on mobile tethering device 102, beyond what is necessary to make telephone calls via the PSTN 108 and that necessary to access applications on mobile communication device 106, provides an ability for a parent to limit the applications with a child has access to while still given the child the ability to freely make telephone calls. In addition, since the example mobile tethering device 102 has the ability to communicate directly with the PSTN 108, the example mobile tethering device 102 may generate goo-location data, which may be desirable for a parent or guardian of the user 102.

In one example, the mobile tethering device 102 including the hardware and software required for accessing the PSTN 108 and for making telephone calls is limited to only making telephone calls to phone numbers authorized by a parent or an administrator. For example, mobile tethering device 102 may not have a traditional keypad with numbers for dialing a phone number. Rather, mobile tethering device 102 may be limited to placing telephone calls to phone numbers predefined in a phonebook on mobile communication device 106.

In one example, the mobile tethering device 102 may be configured with time restrictions defined by a parent or guardian. For example, a parent or guardian may restrict or limit the functionality of the tethering device 102 during certain hours such as during school hours, during evening hours reserved for homework, or during, the night time. For example, the tethering device 102 may be configured to only allow telephone calls and SMS messages between a restricted set of contacts, such as teachers and family members, during defined school hours. In addition, the mobile tethering device 102 may be configured to only allow access to a limited number of applications during defined school hours and restrict access to the remainder of applications. For example, the mobile tethering device 102 may allow access to school-related applications such as email during school hours but restrict access to games.

It should be appreciated that, although the example system for tethering to a mobile computing device has been described as a device that resembles the mobile computing device, any suitable computing device such as a laptop computer, a tablet computer, an e-reader, and so on, may be configured with similar mobile tethering software in order to remotely access a mobile computing device to place telephone calls via the mobile communication device 106 or to access the applications of the mobile computing device.

To further facilitate communication with mobile communication device 106, mobile communication device 106 is equipped with tether interface logic (not shown). In particular, the tether interface logic provided to mobile communication device 106 establishes the identity of mobile tethering device 102 and authorizes mobile tethering device 102 to access the functionality of mobile communication device 106. In addition, tether interface logic interfaces with mobile communication device's 106 hardware and software to provide mobile tethering device 102 with the same functionality as provided by mobile communication device's 106 hardware and software. In one example, tether interface logic is software installed on mobile communication device 106. In another example, the tether interface logic is hardware that interfaces with mobile communication device 106 externally. For example, the tether interface logic may be a hardware dongle or a docking station that connects to mobile communication device 106 via an external interface. In another example, tether interface logic may include a combination of hardware and software. For example, software may be either provided on external hardware such as a dongle or installed on the mobile communication device 106 and configured to operate in combination with external hardware such as a dangle.

In one example, mobile tether device 102 includes an interrupt switch (not shown) that severs the connection with a mobile communication device 106. The interrupt switch may be activated either at mobile tethering device 102 or at mobile communication device 106. This provides a safety feature that can be utilized in the event of the mobile tethering device being compromised. In one example, once the interrupt switch is activated and the connection with a mobile communication device is broken, a connection cannot be re-established remotely from mobile tethering device 102. Rather, a connection may only be re-established via physical contact between mobile tethering device 102 and mobile communication device 106. This may prevent a compromised mobile tethering device 102 from being using, maliciously to gain access to a mobile communication device.

Figure 3:
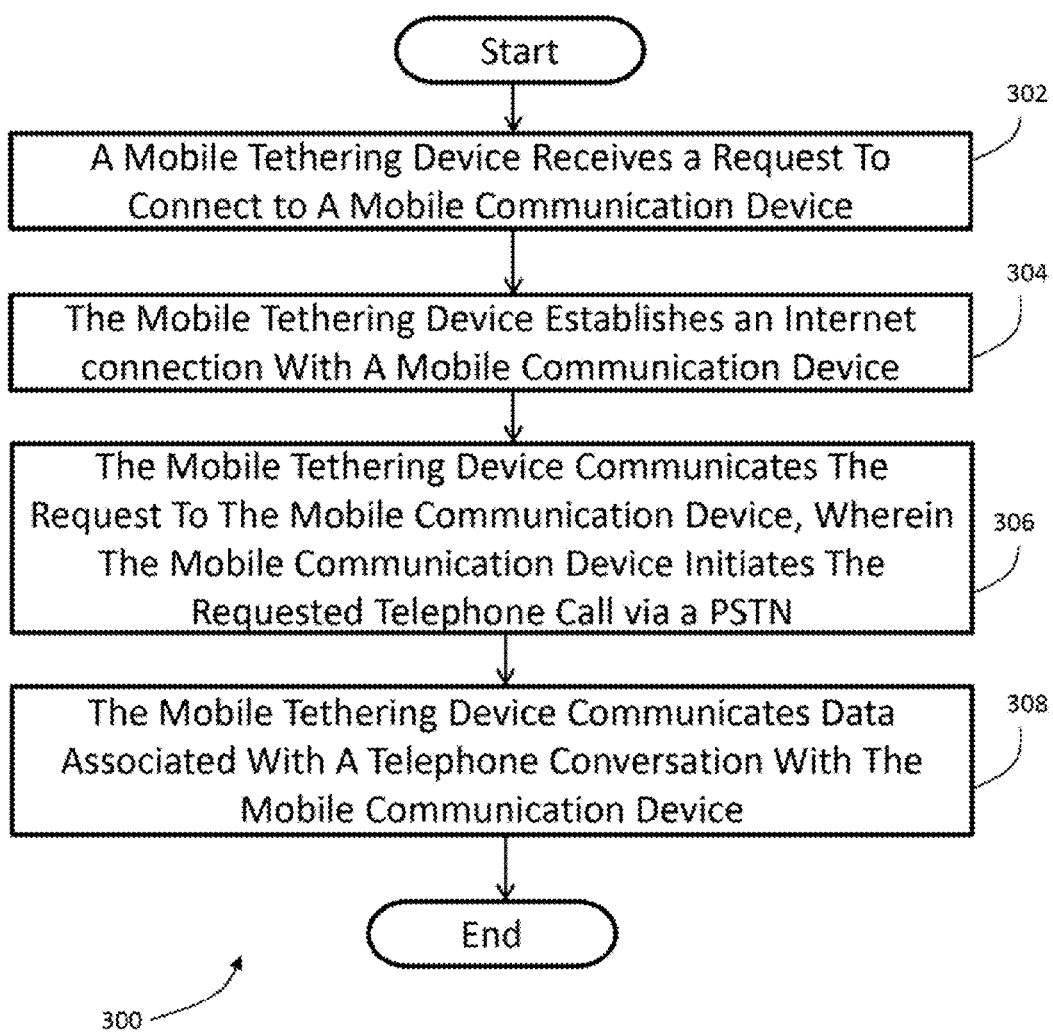
FIG. 3 is an example method for tethering to a mobile communication device.

FIG. 3 is an example method for tethering to a mobile communication device. At step 302, a mobile tethering device receives a request to initiate a connection with a mobile communications device. In one example, the request is a request to initiate operation of an application, rather than to initiate a telephone call. At step 304, the mobile tethering device establishes an Internet connection with a mobile communication device. At step 306, the mobile tethering device communicates the request to the mobile communication device, wherein the mobile communication device initiates the requested telephone call with a PSTN. At step 308, the mobile tethering device communicates with the mobile communication device data associated with a telephone conversation.

While example systems, methods, and so on, have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, and illustrative examples shown or described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

Some portions of the detailed descriptions are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

What is claimed:

1. A mobile tethering device comprising a wireless transceiver, a processor, a computer tangible storage device, and program instructions stored on the storage device for execution by the processor, the program instructions comprising:

first program instructions to receive a request to initiate a connection with a mobile communications device;

second program instructions to establish a wireless connection with a mobile communication device via the wireless transceiver;

third program instructions to communicate, to the mobile communication device, data indicative of a request to initiate a telephone call via the mobile communication device, wherein the mobile communication device is configured to initiate the telephone call via a public switched telephone network; and fourth program instructions to communicate data associated with the telephone call to the mobile communication device to access the public switched telephone network via the mobile communication device while masking the location of the mobile tethering device from the public switched telephone network.

2. The mobile tethering device of claim 1, wherein the program instructions further comprise an operating system, wherein the operating system provides the tethering device with access to resources of the mobile communication device.

3. The mobile tethering device of claim 2, wherein the operating system prevents the mobile tethering device from directly accessing the public switched telephone network.

4. The mobile tethering device of claim 1, wherein the second program instructions to establish a wireless connection with a mobile communication device is configured to establish a secure virtual private network connection.

5. The mobile tethering device of claim 1, further comprising a chassis, wherein the chassis mimics the chassis of the mobile communication device, and wherein the program instructions further comprise fifth program instructions for providing a user interface that simulates a user interface provided by the mobile communication device.

6. The mobile tethering device of claim 1, wherein fourth program instructions to communicate data associated with the telephone call to the mobile communication device is configured to encrypt the data associated with the telephone call.

7. The mobile tethering device of claim 1, wherein the program instructions further comprise:
fifth program instructions to receive a request to operate a mobile application;
sixth program instructions to communicate data indicative of the request to operate a mobile application to the mobile communication device, wherein the mobile communication device is configured to initiate operation of the mobile application via the mobile communication device's operating system; and
seventh program instructions to communicate data associated with operation of the mobile application to the mobile communication device.

8. The mobile tethering device of claim 1, wherein the second program instructions to establish a wireless connection with a mobile communication device is configured to provide a key for confirming identify to the mobile communication device.

9. The mobile tethering device of claim 1, wherein a chassis of the mobile tethering device is potted to deprive an unauthorized user the ability to conduct analysis of the components of the mobile tethering device.

10. The mobile tethering device of claim 1, wherein second program instructions to establish a wireless connection with a mobile communication device is configured to communicate with a hardware device externally coupled to the mobile communication device.

11. The mobile tethering device of claim 1, wherein the program instructions further comprise eighth program instructions to limit access to the mobile communication device during a restricted time period.

12. A method for tethering to a mobile communication device, the method comprising the steps of:
a computing device receiving a request to initiate a connection with a mobile communications device; the computing device establishing a wireless connection with the mobile communication device;
the computing device communicating, to the mobile communication device, data indicative of a request to initiate a telephone call to the mobile communication device, wherein the mobile communication device initiates the telephone call via a public switched telephone network; and
the computing device communicating data associated with the telephone call to the mobile communication device to access the public switched telephone network via the mobile communication device while masking the location of the computing device from the public switched telephone network.

13. The method of claim 12, further comprising the computing device accessing resources of the mobile communication device.

14. The method of claim 12, further comprising the computing device preventing direct access to the public switched telephone network.

15. The method of claim 12, further comprising the computing device establishing a secure virtual private network connection with the mobile communication device.

16. The method of claim 12, further comprising the computing device providing a user interface that simulates a user interface provided by the mobile communication device.

17. The method of claim 12, further comprising the computing device encrypting the data associated with the telephone call.

18. The method of claim 12, further comprising:
the computing device receiving a request to operate a mobile application;
the computing device communicating data indicative of the request to operate a mobile application to the mobile communication device, wherein the mobile communication device is configured to initiate operation of the mobile application; and
the computing device communicating data associated with operation of the mobile application to the mobile communication device.

19. The method of claim 12, further comprising the computing device providing a key for confirming identify to the mobile communication device.

20. The method of claim 12, wherein the step of establishing a wireless connection with a mobile communication device comprises communicating with a hardware device externally coupled to the mobile communication device.

21. The method of claim 12, further comprising the step of the computing device determining whether a current time is outside of a restricted time range responsive to receiving a request to initiate a connection with a mobile communications device and wherein the computing device establishes a wireless connection with the mobile communication device responsive to determining that the current time is outside of the restricted time range.

22. A mobile tethering device comprising a wireless transceiver, a processor, a computer tangible storage device, and program instructions stored on the storage device for execution by the processor, the program instructions comprising;
first program instructions to receive a request to initiate a telephone call;
second program instructions to initiate a telephone call directly via a public switched telephone network;
third program instructions to receive a request to operate a mobile application;

fourth program instructions to establish a wireless connection with a mobile communication device via the wireless transceiver;

fifth program instructions to communicate data, to the mobile communication device, indicative of the request to operate a mobile application via the mobile communication device, wherein the mobile communication device is configured to initiate operation of the mobile application via a public network; and sixth program instructions to communicate data associated with operation of the mobile application to the mobile communication device while masking the location of the mobile tethering device from the public network.

\* \* \* \* \*